US007333560B2

(12) United States Patent
Jalali et al.

(10) Patent No.: US 7,333,560 B2
(45) Date of Patent: Feb. 19, 2008

(54) METHOD AND APPARATUS FOR TRANSMITTING DATA IN A TIME DIVISION DUPLEXED (TDD) COMMUNICATION SYSTEM

(75) Inventors: Ahmad Jalali, San Diego, CA (US); John E. Smee, San Diego, CA (US); Mark Wallace, Bedford, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/328,807

(22) Filed: Jan. 9, 2006

(65) Prior Publication Data

US 2006/0109926 A1    May 25, 2006

Related U.S. Application Data

(63) Continuation of application No. 09/887,225, filed on Jun. 22, 2001, now Pat. No. 7,027,523.

(51) Int. Cl.
*H04K 1/02* (2006.01)
(52) U.S. Cl. ...................... 375/296; 375/285
(58) Field of Classification Search ................ 375/296, 375/284, 285, 299, 358, 371
See application file for complete search history.

(56) References Cited

U.S. PATENT DOCUMENTS

| 5,056,109 A | 10/1991 | Gilhousen et al. |
| 5,265,119 A | 11/1993 | Gilhousen et al. |
| 5,546,090 A | 8/1996 | Roy, III et al. |
| 5,784,363 A | 7/1998 | Engstrom et al. |
| 5,799,005 A | 8/1998 | Soliman |
| 5,828,658 A | 10/1998 | Ottersten |
| 5,903,554 A | 5/1999 | Saints |

(Continued)

FOREIGN PATENT DOCUMENTS

WO    0108369 A1    2/2001

OTHER PUBLICATIONS

Keller et al., "Sub-Band Adaptive Pre-Equalised OFDM Transmission," 1999 IEEE Vehicular Technology Conference, vol. 1 (50):334-338 (Sep. 9, 1999).

(Continued)

*Primary Examiner*—Kevin Kim
(74) *Attorney, Agent, or Firm*—Thomas R. Rouse; Ross L. Franks; Dmitry R. Milikovsky

(57) ABSTRACT

Techniques to process data for transmission in a time division duplexed (TDD) communication system. In one aspect, the frequency response of a forward link is estimated at a base station based on reverse link transmissions (e.g., pilots) from a terminal. Prior to a data transmission on the forward link, the base station determines a reverse transfer function based on the pilots transmitted by the terminal, "calibrates" the reverse transfer function with a calibration function to derive an estimate of a forward transfer function, and preconditions modulation symbols based on weights derived from the forward transfer function. In another aspect, the terminal estimates the "quality" of the forward link and provides this information to the base station. The base station then uses the information to properly code and modulate data prior to transmission such that the transmitted data can be received by the terminal at the desired level of performance.

29 Claims, 5 Drawing Sheets

U.S. PATENT DOCUMENTS

| | | |
|---|---|---|
| 5,933,421 A | 8/1999 | Alamouti et al. |
| 5,982,327 A * | 11/1999 | Vook et al. ............... 342/380 |
| 6,037,898 A | 3/2000 | Parish et al. |
| 6,084,929 A * | 7/2000 | Molnar et al. ............. 375/350 |
| 6,097,972 A | 8/2000 | Saints et al. |
| 6,131,016 A | 10/2000 | Greenstein et al. |
| 6,141,567 A | 10/2000 | Youssefmir |
| 6,144,711 A | 11/2000 | Raleigh et al. |
| 6,615,024 B1 | 9/2003 | Boros |
| 6,650,714 B2 | 11/2003 | Dogan et al. |
| 6,665,545 B1 * | 12/2003 | Raleigh et al. ........... 455/562.1 |
| 6,888,809 B1 * | 5/2005 | Foschini et al. ............ 370/334 |
| 7,027,429 B2 * | 4/2006 | Laroia et al. ............... 370/350 |
| 7,194,006 B2 * | 3/2007 | Wong et al. ................. 370/436 |
| 7,200,368 B1 * | 4/2007 | Hottinen et al. ............ 455/101 |
| 2002/0122381 A1 * | 9/2002 | Wu et al. ................... 370/208 |

OTHER PUBLICATIONS

Rohling et al., "Adaptive Coding and Modulation in an OFDM-TDMA Communication System," 1998 IEEE Vehicular Technology Conference, pp. 773-776 (May 18, 1998).

Munster et al., "Co-channel Interference Suppression Assisted Adaptive OFDM in Interference Limited Environments," 1999 IEEE Vehicular Technology Conference, vol. 1 (50):284-288 (Sep. 9, 1999).

* cited by examiner

METHOD AND APPARATUS FOR TRANSMITTING DATA IN A TIME DIVISION DUPLEXED (TDD) COMMUNICATION SYSTEM

CLAIM OF PRIORITY UNDER 35 U.S.C. § 120

The present Application for Patent is a continuation of patent application Ser. No. 09/887,225 entitled "METHOD AND APPARATUS FOR TRANSMITTING DATA IN A TIME DIVISION DUPLEXED (TDD) COMMUNICATION SYSTEM" filed Jun. 22, 2001, now issued as U.S Pat. No. 7,027,523, and assigned to the assignee hereof and hereby expressly incorporated by reference herein.

BACKGROUND

1. Field

The present invention relates generally to data communication, and more specifically to techniques for processing data for transmission in a time division duplexed (TDD) communication system.

2. Background

A multi-channel communication system is often deployed to provide increased transmission capacity for various types of communication such as voice, data, and so on. Such a multi-channel system may be a multiple-input multiple-output (MIMO) communication system, an orthogonal frequency division modulation (OFDM) system, a MIMO system that utilizes OFDM, or some other type of system. A MIMO system employs multiple transmit antennas and multiple receive antennas to exploit spatial multiplexing to support a number of spatial subchannels, each of which may be used to transmit data. An OFDM system effectively partitions the operating frequency band into a number of frequency subchannels (or frequency bins or subbands), each of which is associated with a respective sub-carrier on which data may be modulated. A multi-channel communication system thus supports a number of "transmission" channels, each of which may correspond to a spatial subchannel in a MIMO system, a frequency subchannel in an OFDM system, or a spatial subchannel of a frequency subchannel in a MIMO system that utilizes OFDM.

The transmission channels of a multi-channel communication system typically experience different link conditions (e.g., due to different fading and multipath effects) and may achieve different signal-to-noise-plus-interference ratios (SNRs). Consequently, the transmission capacities (i.e., the information bit rates) that may be supported by the transmission channels for a particular level of performance may be different from channel to channel. Moreover, the link conditions typically vary over time. As a result, the bit rates supported by the transmission channels also vary with time.

A time division duplexed (TDD) communication system transmits data on the forward and reverse links via the same frequency band. The forward link refers to transmission from a base station to a terminal and the reverse link refers to transmission from the terminal to the base station. In the TDD system, the transmission time is partitioned into time slots, and some of the time slots are allocated for forward link transmission and remaining time slots are allocated for reverse link transmission. Because the forward and reverse links share the same frequency band, the characteristics of the forward link may be estimated by measuring the characteristics of the reverse link, and vice versa. This reciprocity property of the forward and reverse link propagation may be used to more easily characterize the communication link.

Given the above, techniques that can be used to (1) exploit the reciprocal property of the forward and reverse links in a TDD communication system and (2) process data for transmission on multiple transmission channels with different capacities to achieve high performance are highly desirable.

SUMMARY

Aspects of the invention provide various techniques to process data for transmission in a time division duplexed (TDD) communication system. In one aspect, the frequency response of a forward link is estimated at a base station based on reverse link transmissions (e.g., pilot references) from a terminal. Initially, an overall transfer function, $H_f(\omega)$, of a forward link transmission from the base station to the terminal and an overall transfer function, $H_r(\omega)$, of a reverse link transmission on the reciprocal reverse link from the terminal to the base station are used to derive a calibration function, $a(\omega)$, which is descriptive of the difference between the forward and reverse transfer functions. Prior to a data transmission on the forward link, the base station determines the reverse transfer function based on the pilot references transmitted by the terminal. The base station then "calibrates" the reverse transfer function with the calibration function to derive an estimate of the forward transfer function, which is then used to precondition modulation symbols prior to transmission to the terminal.

In another aspect, the terminal estimates the "quality" of the forward link and provides this information to the base station. The forward link quality may be quantified by a signal-to-noise-plus-interference ratio (SNR), a noise-plus-interference, or some other measurement. The forward link quality may be estimated at the terminal based on pilot reference, packet data, or some other signals transmitted on the forward link. The forward link quality estimate is then represented in a particular form and sent to the base station, which then uses the information to properly code and modulate data prior to transmission such that the transmitted data can be received by the terminal at the desired level of performance.

The techniques described herein may be applied for data transmission on the forward and reverse links. The invention further provides methods, systems, and apparatus that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
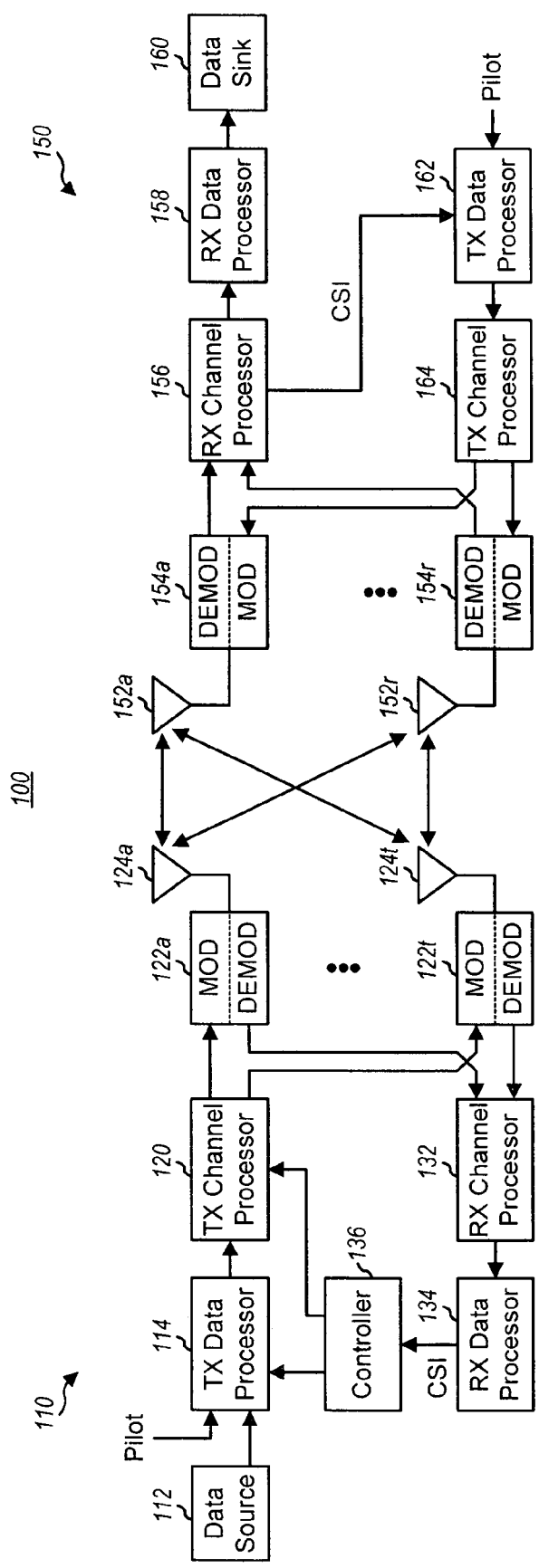
FIG. 1 is a diagram of a time division duplexed (TDD) communication system capable of implementing various aspects and embodiments of the invention.

FIG. 1 is a diagram of a time division duplexed (TDD) communication system 100 capable of implementing various aspects and embodiments of the invention. System 100 may be a wireless local area network (LAN) or some other type of system, and includes a base station 110 in communication with one or more terminals 150 (only one terminal is shown for simplicity). System 100 transmits data on the forward and reverse links in a time division duplexed manner via the same frequency band. For the TDD system, the transmission time is partitioned into time slots, and some of the time slots are allocated for forward link transmission and remaining time slots are allocated for reverse link transmission. For example, the forward and reverse links may be allocated alternating time slots.

The techniques described herein may be applied for data transmission on the forward and reverse links. However, for clarity, various aspects and embodiments of the invention are specifically described below for the forward link transmission.

System 100 supports one or more transmission channels on each of the forward and reverse links, and some or all of the available transmission channels may be used for data transmission at any given moment. The number of transmission channels on the forward link needs not be equal to the number of transmission channels on the reverse link. Multiple transmission channels may be provided via multiple-input multiple-output (MIMO), orthogonal frequency division modulation (OFDM), MIMO in combination with OFDM, or some other constructs. System 100 may also implement code division multiple access (CDMA), time division multiple access (TDMA), frequency division multiple access (FDMA), or some other multiple access techniques. Multiple access techniques can be used to support concurrent communication with a number of terminals.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_C$ independent channels, with $N_C \leq \min \{N_T, N_R\}$. Each of the $N_C$ independent channels is also referred to as a spatial subchannel of the MIMO channel and corresponds to a dimension.

An OFDM system effectively partitions the operating frequency band into a number of ($N_F$) frequency subchannels (i.e., frequency bins or subbands). At each time slot, a modulation symbol may be transmitted on each of the $N_F$ frequency subchannels. Each time slot corresponds to a particular time interval that may be dependent on the bandwidth of the frequency subchannel.

System 100 may be operated to transmit data via one or more transmission channels on each of the forward and reverse links. If MIMO is employed but not OFDM, there is typically only one frequency subchannel and each spatial subchannel may be referred to as a transmission channel. If OFDM is employed but not MIMO, there is only one spatial subchannel for each frequency subchannel and each frequency subchannel may be referred to as a transmission channel. And if both MIMO and OFDM are employed, each spatial subchannel of each frequency subchannel may be referred to as a transmission channel.

The techniques described herein may be applied to TDD systems employing one or more transmission channels. For clarity, various aspects are described below in which the TDD system employs MIMO and OFDM, although neither MIMO nor OFDM is necessary to implement the inventive techniques described herein.

As shown in FIG. 1, system 100 may be operated to employ a combination of antenna, frequency, and temporal diversity to increase spectral efficiency, improve performance, and enhance flexibility. In an aspect, base station 110 can be operated to estimate the characteristics of the communication link between the base station and terminal and to derive channel state information (CSI) indicative of the estimated link characteristics. Base station 110 can then be operated to adjust the processing (e.g., encoding, modulation, and preconditioning) of data prior to transmission to terminal 150 based on the CSI derived at the base station and/or the CSI provided to the base station (e.g., from the terminal).

At base station 110, a data source 112 provides packet data (i.e., information bits) to a transmit (TX) data processor 114, which (1) encodes the packet data in accordance with a particular encoding scheme, (2) interleaves (i.e., reorders) the encoded data based on a particular interleaving scheme, (3) channelizes the interleaved data and pilot data on their respective code channels (if code division multiplexing is used), and (4) maps the channelized packet and pilot data into modulation symbols for one or more transmission channels used for data transmission. The encoding increases the reliability of the data transmission. The interleaving provides time diversity for the coded bits, permits the data to be transmitted based on an average signal-to-noise-plus-interference-ratio (SNR) for the transmission channels used for the data transmission, combats fading, and further removes correlation between the coded bits used to form each modulation symbol. The interleaving may further provide frequency diversity if the coded bits are transmitted over multiple frequency subchannels. The channelization allows the packet and pilot data to be separated at the terminal.

In an aspect, the coding, interleaving, and symbol mapping (or any combination thereof) may be performed based on the CSI available to base station 110, as indicated in FIG. 1. The encoding, interleaving, and symbol mapping at base station 110 may be performed based on numerous schemes, some of which are described in further detail below.

A TX channel processor 120 receives and demultiplexes the modulation symbols from TX data processor 114 and further preconditions the modulation symbols as described below. If MIMO employed, TX channel processor 120 provides a stream of preconditioned modulation symbols for each antenna used for data transmission. If OFDM is employed, TX channel processor 120 provides a stream of preconditioned modulation symbol vectors for each antenna used for data transmission, one vector for each time slot with each vector including one modulation symbol for each frequency subchannel. Each stream is then received and modulated by a respective modulator (MOD) 122 and transmitted via an associated antenna 124.

At terminal 150, one or more antennas 152 receive the transmitted signals and each antenna provides a respective received signal to an associated demodulator (DEMOD) 154. Each demodulator 154 performs processing complementary to that performed at modulator 122. The received modulation symbols from all demodulators 154 are then provided to a receive (RX) channel processor 156, which performs receiver processing complementary to the processing performed by TX channel processor 120. RX channel processor 156 provides recovered modulation symbols to a RX data processor 158, which processes the symbols to recover the transmitted data streams. RX data processor 158 performs processing complementary to that performed by TX data processor 114. The decoded data is then provided to a data sink 160. The processing by base station 110 and terminal 150 is described in further detail below.

The one or more transmission channels available to system 100 typically experience different link conditions (e.g., due to different fading and multipath effects) and may achieve different SNRs. Consequently, the capacity of the transmission channels may differ from channel to channel. This capacity may be quantified by the information bit rate (i.e., the number of information bits per modulation symbol) that may be transmitted on each transmission channel for a particular level of performance (e.g., a particular bit error rate (BER) or packet error rate (PER)). Since the link conditions typically vary with time, the supported information bit rates for the transmission channels also vary with time.

To more fully utilize the capacity of the transmission channels, channel state information (CSI) descriptive of the forward link may be determined and used to process (e.g., encode, modulate, and precondition) data such that the transmitted information bit rates match the transmission capacities of the transmission channels. The CSI may include various types of information and may be derived and/or provided in various forms, some of which are described below.

One type of CSI relates to the "quality" of the forward link. This quality may be quantified by the SNRs of individual transmission channels or an average SNR of each group of transmission channels, the rates or average rate supported by the channels, and coding and modulation schemes supported by the channels, and so on, as described below. Information descriptive of the forward link quality may be used to properly code and modulate data prior to transmission such that the transmitted data may be recovered by the terminal with the desired level of performance (1% PER). Estimation and use of the forward link quality is described in further detail below.

Another type of CSI relates to the "response" of the forward link. This response may be quantified by the amplitude and phase across the entire operating frequency band for the propagation path between each transmit-receive antenna pair used for data transmission. Information descriptive of the forward link response may be used to precondition modulation symbols prior to transmission to orthogonalize the spatial subchannels, which may improve performance. Characterization of the forward link response and preconditioning of the modulation symbols are also described in further detail below.

Various types of transmission may be used to characterize the forward link response and to estimate the forward link quality. For example, pilot data (i.e., data of a known pattern such as a sequence of all zeros), packet data, signaling, and possibly other types of transmission may be used. For clarity, various aspects and embodiments of the invention, including the characterization of the forward link response and the estimation of the quality of the forward link, are described below based on the use of pilot reference.

Characterization of Forward Link Response

For a TDD communication system, a single frequency band is used for both the forward and reverse links, and the propagation paths for the forward and reverse links are reciprocal. In this case, the characteristics of the forward link may be estimated based on measurements of the reverse link, and vice versa, if the time-variant changes in the communication link are slow relative to the difference between the time the link is estimated and the time the estimates are used. For example, if the forward and reverse links are assigned alternating time slots, then the time slots should be short enough so that the communication link does not change appreciably between the time slot in which the link is characterized and the time slot in which the link characterization is applied for a data transmission.

In accordance with an aspect of the invention, the response of the forward link is estimated at the base station based on reverse link transmissions from the terminal. An overall transfer function, $H_f(\omega)$, of a forward link transmission from the base station to the terminal and an overall transfer function, $H_r(\omega)$, of a reverse link transmission on the reciprocal reverse link from the terminal to the base station may be expressed as:

$$H_f(\omega) = T_f(\omega) C(\omega) R_{f(\omega)}, \text{ and} \qquad \text{Eq (1)}$$

$$H_r(\omega) = T_r(\omega) C(\omega) R_r(\omega),$$

where
$T_f(\omega)$ is a transfer function for the aggregate processing at the base station for the forward link transmission (e.g., the transfer function for TX channel processor 120 and modulator 122 within base station 110 in FIG. 1);

$R_f(\omega)$ is a transfer function for the aggregate processing at the terminal for the forward link transmission (e.g., the transfer function for demodulator 154 and RX channel processor 156 within terminal 150 in FIG. 1);

$C(\omega)$ is the channel frequency response (e.g., for a particular propagation path or transmit-receive antenna pair);

$T_r(\omega)$ is a transfer function for the aggregate processing at the terminal for the reverse link transmission (e.g., the transfer function for TX channel processor 162 and modulator 154 within terminal 150 in FIG. 1); and $R_r(\omega)$ is a transfer function for the aggregate processing at the base station for the reverse link transmission (e.g., the transfer function for demodulator 122 and RX channel processor 132 within base station 110 in FIG. 1).

$H_r(\omega)$ may be determined at the base station based on pilot reference transmitted from the terminal on the reverse link. Similarly, $H_f(\omega)$ may be determined at the terminal based on pilot reference transmitted from the base station on the forward link, and may be subsequently provided to the base station.

As noted above, the forward and reverse links for a TDD system are generally reciprocal. Thus, if the signal processing (e.g., filtering) at the base station and terminal for the forward link transmission is identical to the signal processing at the terminal and base station for the reverse link transmission, then both the base station and terminal can measure identical transfer functions (i.e., $H_f(\omega) = H_r(\omega)$), except for errors induced by estimation and imperfect calibration. However, in a practical implementation, the forward transfer function, $H_f(\omega)$, may not be identical to the reverse transfer function, $H_r(\omega)$. This may be due to, for example, different signal processing elements used at the base station and terminal for the forward and reverse link transmissions. For example, the frequency response of the transmit and receive filters for the forward link transmission may be different from the frequency response of the transmit and receive filters for the reverse link transmission.

In accordance with an aspect of the invention, the difference between the forward and reverse transfer functions for the forward and reverse link transmissions is determined and used to more accurately estimate the forward transfer function at the base station, which may provide improved performance. Initially, the base station determines the reverse transfer function, $H_r(\omega)$, based on the pilot reference transmitted by the terminal. The terminal also determines the forward transfer function, $H_f(\omega)$, based on the pilot reference transmitted by the base station. The terminal then sends information indicative of the forward transfer function, $H_f(\omega)$, back to the base station, which then uses the information to perform a calibration. Since the signal processing at the base station and terminal typically does not change appreciably during a communication session, $H_f(\omega)$, may be reported at the start of the session and may be updated thereafter, as necessary.

A calibration function, $a(\omega)$, may then be derived based on the forward and reverse transfer functions, as follows:

$$a(\omega) = \frac{H_f(\omega)}{H_r(\omega)} \qquad \text{Eq (2)}$$
$$= \frac{T_f(\omega) C(\omega) R_f(\omega)}{T_r(\omega) C(\omega) R_r(\omega)}$$
$$= \frac{T_f(\omega) R_f(\omega)}{T_r(\omega) R_r(\omega)}.$$

In equation (2), it is assumed that there are no zeros in the reverse transfer function, $H_r(\omega)$, so that division by zero is not encountered. The calibration function, $a(\omega)$, typically includes a set of complex values for a set of frequencies.

If MIMO is employed, then the calibration function may be derived based on the pilot transmitted on a particular propagation path (i.e., a particular transmit-receive antenna pair). If OFDM is employed, then the calibration function may be derived based on the pilot transmitted on all or a subset of the $N_F$ frequency subchannels. In this case, the calibration function, a(k), may be expressed as a function of k, the index of the frequency subchannels and would typically include $N_F$ complex values for the $N_F$ frequency subchannels.

The signal processing at both the base station and terminal may be a function of frequency, and a calibration function is typically derived for each propagation path (i.e., each transmit-receive antenna pair). The calibration function for propagation path (i, j, k) (i.e., the path for the k-th frequency subchannel from the i-th terminal antenna to the j-th base station antenna) may be expressed as:

$$a(i, j, k) = \frac{T_f(j, k) \cdot R_f(i, k)}{T_r(i, k) \cdot R_r(j, k)}.$$

For example, if there are two transmit antennas and two receive antennas, then four calibration functions may be derived, one for each of the four transmit-receive antenna pairs.

Prior to a data transmission from the base station to the terminal, the forward link response may be characterized at the base station based on the pilot reference transmitted on the reverse link. In an embodiment, the forward link response characterization entails estimating the response of each transmit-receive antenna pair of each frequency subchannel (i.e., each propagation path). A reverse transfer function $h_r(i,j,k)$ for propagation path (i,j,k) may be expressed as:

$$h_r(i,j,k) = T_r(i,k) \cdot c(i,j,k) \cdot R_r(j,k).$$

This reverse transfer function $h_r(i,j,k)$ may be obtained by processing and measuring the pilot reference transmitted on propagation path (i,j,k).

The base station can then estimate the forward transfer function, $h_f(i,j,k)$, for propagation path (i,j,k) by multiplying the reverse transfer function, $h_r(i,j,k)$, with the calibration coefficient, a(i,j,k), as follows:

$$h_f(i, j, k) = h_r(i, j, k) \cdot a(i, j, k), \qquad \text{Eq (3)}$$
$$= T_r(i, k) \cdot c(i, j, k) \cdot R_r(j, k) \cdot \frac{T_f(j, k) \cdot R_f(i, k)}{T_r(i, k) \cdot R_r(j, k)},$$
$$= T_f(j, k) \cdot c(i, j, k) \cdot R_f(i, k).$$

The forward transfer functions, $h_f(i,j,k)$, for all propagation paths may then be used to form one or more channel response matrices $H_f(k)$. Typically, one channel response metric $H_f(k)$ is formed for each frequency subchannel. Each channel response matrix $H_f(k)$ comprises an $N_T \times N_R$ matrix of forward transfer functions $h_f(i,j,k)$, where $1 \leq i \leq N_R$ and $1 \leq j \leq N_T$, for the $N_T \cdot N_R$ transmit-receive antenna pairs for the k-th frequency subchannel. Each channel response matrix $H_f(k)$ may then be used to derive weights, which are then used to precondition the modulation symbols for the k-th frequency subchannel, as described below.

For each frequency subchannel, an eigenvector decomposition of a Hermitian matrix formed by the product of the channel response matrix $H_f$ with its conjugate-transpose $H_f^H$ can be expressed as:

$$H_f^H H_f = E \Lambda E^H, \qquad \text{Eq (4)}$$

where E is an eigenvector matrix and $\Lambda$ is a diagonal matrix of eigenvalues, both of dimension $N_T \times N_T$, and the symbol "H" denotes the conjugate-transpose. The base station preconditions a vector of $N_C$ modulation symbols, $\underline{b}$, for each time slot using the eigenvector matrix E, as follows:

$$\underline{x} = E\underline{b}. \qquad \text{Eq (5)}$$

The preconditioning in equation (5) can be more fully expressed as:

$$\begin{bmatrix} x_1 \\ x_2 \\ \vdots \\ x_{N_T} \end{bmatrix} = \begin{bmatrix} e_{11}, & e_{12}, & \cdots & e_{1N_C} \\ e_{21}, & e_{22}, & & e_{2N_C} \\ \vdots & & \ddots & \vdots \\ e_{N_T 1}, & e_{N_T 1}, & \cdots & e_{N_T N_C} \end{bmatrix} \cdot \begin{bmatrix} b_1 \\ b_2 \\ \vdots \\ b_{N_C} \end{bmatrix}, \qquad \text{Eq (6)}$$

where $[b_1, b_2, \ldots b_{N_C}]$ are the modulation symbols for spatial subchannels 1, 2, . . . $N_C$, respectively, where $N_C \leq \min\{N_T, N_R\}$;

$e_{ij}$ are elements of the eigenvector matrix E, which is descriptive of the transmission characteristics from the base station antennas to the terminal antennas; and $[x_1, x_2, \ldots x_{N_T}]$ are the preconditioned modulation symbols, which can be expressed as:

$$x_1 = b_1 \cdot e_{11} + b_2 \cdot e_{12} + \ldots + b_{N_C} \cdot e_{1N_C},$$
$$x_2 = b_1 \cdot e_{21} + b_2 \cdot e_{22} + \ldots + b_{N_C} \cdot e_{2N_C}, \text{ and}$$
$$x_{N_T} = b_1 \cdot e_{N_T 1} + b_2 \cdot e_{N_T 2} + \ldots + b_{N_C} \cdot e_{N_T N_C}.$$

Since $H^H H$ is Hermitian, the eigenvector matrix E is unitary. Thus, if the elements of the vector $\underline{b}$ have equal power, the elements of the vector $\underline{x}$ (i.e., the preconditioned modulation symbols) also have equal power.

As shown in equations (5) and (6), for each frequency subchannel, the $N_C$ modulation symbols at each time slot are preconditioned to generate $N_T$ preconditioned modulation symbols. The preconditioning orthogonalizes the modulation symbol streams transmitted on the $N_C$ spatial subchannels, which may improve performance.

Figure 2:
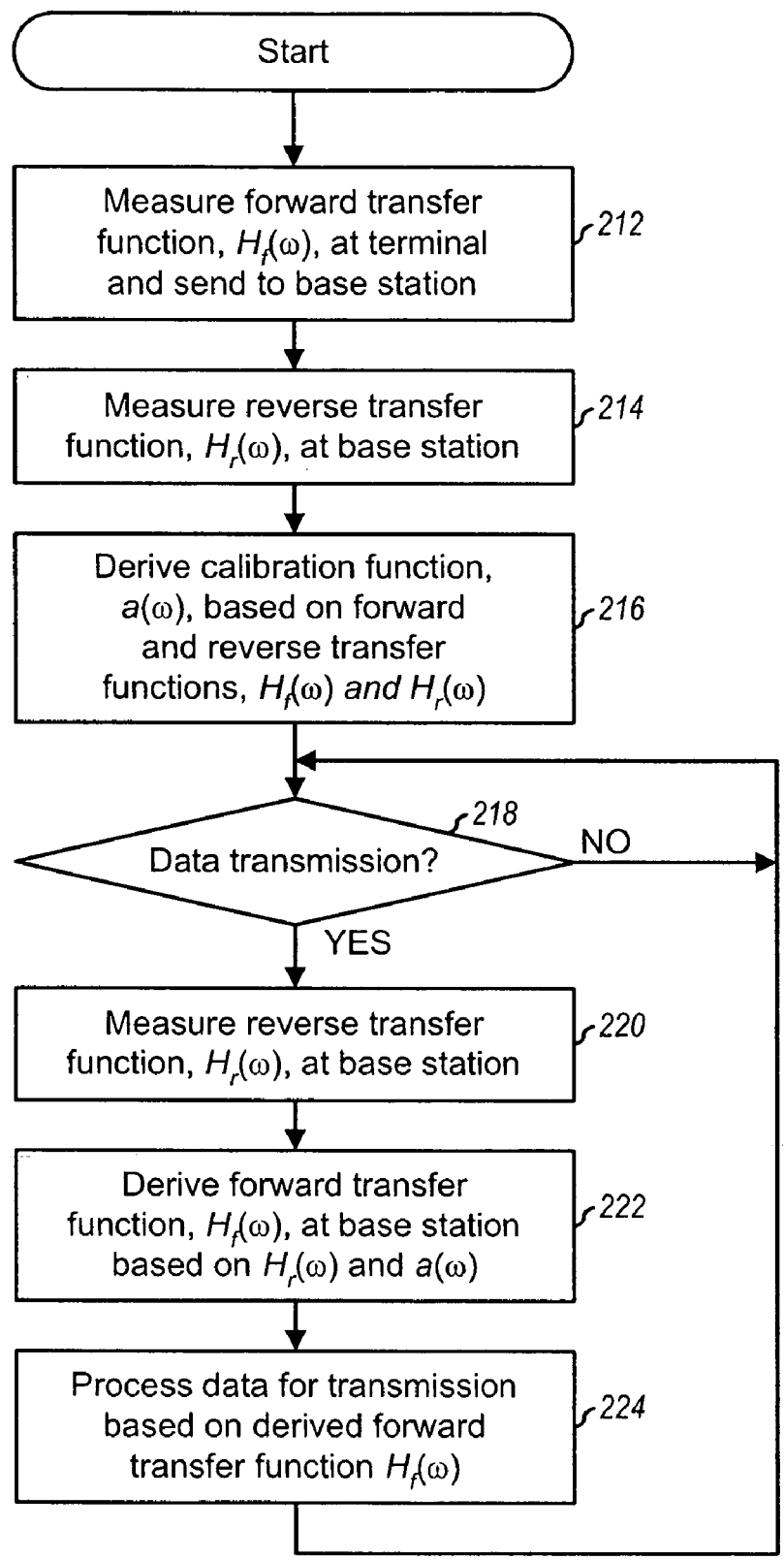
FIG. 2 is a flow diagram of an embodiment of a process to derive a calibration function and to precondition modulation symbols prior to transmission.

FIG. 2 is a flow diagram of a process to derive the calibration function and to precondition modulation symbols prior to transmission on the forward link, in accordance with an embodiment of the invention. Initially (e.g., at the start of a communication session between a base station and a terminal), the terminal measures the forward transfer function, $H_f(\omega)$, and sends it back to the base station, at step 212. The base station also measures the reverse transfer function, $H_r(\omega)$, at step 214. The forward and reverse transfer functions, $H_f(\omega)$ and $H_r(\omega)$, are then used by the base station to derive the calibration function, $a(\omega)$, as shown in equation (2), at step 216. Steps 212 through 216 may be performed prior to the first data transmission from the base station to the terminal, and may also be performed thereafter as needed during the communication session.

A determination is then made whether or not there is a data transmission for the terminal, at step 218. If there is no data to transmit, then the process returns to step 218 and waits (e.g., until the next time slot for the forward link). Otherwise, if there is data to transmit, the base station measures the reverse transfer function, $H_r(\omega)$, at step 220. The base station then derives the forward transfer function, $H_f(\omega)$, based on the reverse transfer function, $H_r(\omega)$, and the calibration function, $a(\omega)$, as shown in equation (3), at step 222. The forward transfer function, $H_f(\omega)$, is then used to process data prior to transmission to the terminal, at step 224. More particularly, the forward transfer function, $H_f(\omega)$, is used to derive the eigenvector matrix E, as shown in equation (4), which is then used to precondition the modulation symbols, as shown in equations (5) and (6). The process then returns to step 218 and waits for the next data transmission (or the next time slot).

Receiver Processing

The received signals at the terminal may be expressed as:

$$\underline{r} = H_f \underline{x} + \underline{n}, \qquad \text{Eq (7)}$$
$$= H_f E \underline{b} + \underline{n},$$

where $\underline{n}$ is the channel noise.

To recover the transmitted modulation symbols, the terminal initially performs a channel-matched-filter operation, followed by a multiplication by the right eigenvector matrix. The result of the channel-matched-filter and multiplication operations is a vector $\underline{y}$, which can be expressed as:

$$\underline{y} = E^H H_f^H \underline{r}, \qquad \text{Eq (8)}$$
$$= E^H H_f^H H_f E \underline{b} + E^H H_f^H \underline{n},$$
$$= \Lambda \underline{b} + \hat{\underline{n}},$$

where $\hat{\underline{n}}$ is the noise term after the receiver processing at the terminal. The channel response matrix, $H_f$, for the forward link used to perform the channel-matched-filter operation may be determined at the terminal based on the pilot reference transmitted from the base station. As shown in equation (8), the resultant vector $\underline{y}$ is a scaled version of the vector $\underline{b}$, which includes the modulation symbols prior to the preconditioning with the eigenvector matrix E at the base station. The scaling between the vectors $\underline{b}$ and $\underline{y}$ is based on the eigenvalues in the matrix $\Lambda$.

The noise term $\hat{\underline{n}}$ after the receiver processing has a covariance that can be expressed as:

$$E\{\hat{\underline{n}}\hat{\underline{n}}^H\} = E(E^H H_f^H \underline{n} \underline{n}^H H_f E), \qquad \text{Eq (9)}$$
$$= E^H H_f^H H_f E,$$
$$= \Lambda,$$

where $E\{\}$ is the expectation operation. From equation (9), the noise components for the spatial subchannels, after the receiver processing at the terminal, are independent with variances given by the eigenvalues. If the elements of $\underline{b}$ have equal power and if $E\{\hat{\underline{n}}\hat{\underline{n}}^H\}=I$, then the SNR of the i-th component of the vector $\underline{y}$ (i.e., the i-th spat subchannel) is $\lambda_i$, which is the i-th diagonal element of the matrix $\Lambda$ of eigenvalues.

Pilot Transmission Schemes

Various schemes may be used to transmit a pilot reference from a transmitter unit (e.g., a terminal) to a receiver unit (e.g., a base station) to allow the receiver unit to characterize the communication link. The pilot reference is typically transmitted from all or a subset of the antennas at the transmitter unit and on a sufficient number of frequency subchannels such that an accurate characterization of the communication link can be made. The transmitted pilot reference is received by all antennas at the receiver unit and processed to characterize the link response.

The particular pilot transmission scheme to be used may be selected based on various system constraints and considerations. The transmission scheme used for the reverse link may not be the same as that used for the forward link. As an example, the forward link may support MIMO whereas the reverse link may only support single-input multiple-output (SIMO), in which case the pilot transmission scheme should account for this difference. Some schemes for transmitting the pilot reference on the reverse link from the terminal to the base station are described below.

In one pilot transmission scheme, the terminal transmits the pilot reference continuously (i.e., in all time slots allocated for the reverse link) from all antennas and on a sufficient number of subchannels. The pilot reference may be transmitted along with other packet data. For this scheme, the pilot reference is readily available to the base station for channel characterization at all times.

If the pilot reference is transmitted from multiple antennas on a particular frequency subchannel (there may be only one frequency subchannel if OFDM is not employed) in a given time slot, then the pilot transmitted on different antennas should be orthogonal to each other. This would then allow the base station to recover the individual pilot reference transmitted on each antenna. In a single-carrier system, orthogonality may be achieved by transmitting the pilot on a different code channel from each antenna (e.g., covering the pilot data for each antenna with a different Walsh code).

If OFDM is employed, the frequency response of the communication link may be determined for a subset of the frequency subchannels instead of all frequency subchannels. For example, if $N_F$ frequency subchannels and $N_R$ antennas are available at the terminal, then the pilot reference may be transmitted on $N_F/N_R$ frequency subchannels of each of the $N_R$ antennas. The $N_F/N_R$ frequency subchannels used for pilot transmission on each antenna are selected such that an accurate estimate of the frequency response may be made. For example, the pilot reference may be transmitted on frequency subchannels that are spaced over the entire frequency band and are $N_R$ channels apart. The $N_F/N_R$ frequency subchannels for each antenna may be staggered (i.e., offset) relative to those of other antennas. In general, the number of frequency subchannels selected for pilot transmission for each antenna should be sufficient to allow for an accurate sampling of the spectrum of the communication link. The frequency domain sampling allows the forward link response to be estimated using fewer pilot transmissions.

In another pilot transmission scheme, the terminal transmits a pilot reference in a time division multiplexed (TDM) manner from all antennas and on all or a subset of the frequency subchannels. For example, the pilot reference may be transmitted on all or a subset of the frequency subchannels from one antenna at each available time slot in a sequential manner (e.g., in a round-robin manner). Thus, the pilot reference may be transmitted from antenna 1 at a particular time slot, from antenna 2 at the next available time slot, and so on. Numerous other TDM schemes may also be used to transmit the pilot reference from the terminal.

In yet another pilot transmission scheme, multiple terminals are able to concurrently transmit pilot references at the same time via code division multiplexing (CDM). For example, terminal 1 may transmit the pilot reference on a first set of code channels (from all or a subset of the antennas), terminal 2 may transmit the pilot reference on a second set of code channels, and so on. The code channels are designed to be orthogonal to each other so that the pilot references from different terminals can be individually recovered at the base station, which then allows the base station to characterize the forward link response for each of the terminals.

In yet another pilot transmission scheme, multiple terminals are able to concurrently transmit pilot references at the same time via time division multiplexing (TDM). In an implementation, one terminal may be designated to transmit pilot reference on the reverse link at any given time slot. In a first embodiment, the pilot transmissions on the reverse link are scheduled by the base station using a scheme such as polling. Whenever the base station needs to transmit data to a particular terminal, that terminal is notified prior to the data transmission. The terminal then transmits pilot reference on all or a subset of the frequency subchannels and from all or a subset of the antennas to allow the base station to characterize the forward link for this terminal. In a second embodiment, the terminals are assigned fixed time slots for pilot transmission. For example, terminal 1 may be assigned to transmit the pilot reference in every n-th time slot starting with a particular time slot (from all or a subset of the antennas and on all or a subset of the frequency subchannels), terminal 2 may be assigned to transmit the pilot reference on every n-th time slot starting with the next available time slot, and so on. For TDM pilot transmission schemes, the time slots are assigned to the terminals such that the forward link can be characterized close to the time of actual data transmission on the forward link. In this way, accurate forward link characterization may be obtained.

In yet another pilot transmission scheme, multiple terminals are able to concurrently transmit pilot references at the same time via frequency division multiplexing (FDM). For example, at time slot n, terminal 1 may transmit the pilot reference on frequency subchannel 1 (from all or a subset of the antennas), terminal 2 may transmit the pilot reference on frequency subchannel 2, and so on.

As described above, the forward link frequency response for each terminal may be sampled using a subset of the frequency subchannels. For example, $N_X$ terminals may be designated to transmit pilot references on $N_F$ frequency subchannels, and each terminal may be allocated $N_F/N_X$ frequency subchannels for pilot transmission. The $N_F/N_X$ frequency subchannels for each terminal are selected such that an accurate estimate of the frequency response may be made. The pilot reference may be transmitted on frequency subchannels that are spaced over the entire frequency band and are $N_X$ channels apart.

Using the techniques described above, the base station is able to characterize the response of the forward link based on the pilot reference transmitted by the terminal. This characterization typically includes estimates of the frequency response for the communication link (e.g., the MIMO channel). This information may be used to orthogonalize the spatial subchannels, as described above.

In some other embodiments, the forward link is characterized at the terminal based on the pilot transmitted from the base station. The forward link characterization is then sent back to the base station, which then uses the information to process data (e.g., precondition the modulation symbols) for the forward link transmissions.

Forward Link Quality Estimate/Coding and Modulation Scheme

In accordance with another aspect of the invention, the terminal estimates the "quality" of the forward link and provides this information to the base station. The forward link quality may be quantified by the SNR, the noise-plus-interference, or some other measurement. The SNR may be estimated for each transmission channel, each transmit-receive antenna pair, or for groups of these transmission channels or antenna pairs. The forward link quality may be estimated based on the pilot reference, data, or some other signals transmitted on the forward link. The forward link quality estimate is then represented in a particular form and sent to the base station, which then uses the information to properly code and modulate data prior to transmission such that the transmitted data can be received by the terminal at the desired level of performance (e.g., 1% PER).

In an embodiment, one coding and modulation scheme is used for all transmission channels to be used for the forward link transmission. In this case, the terminal can estimate the average SNR across all transmission channels and report this average SNR to the base station. For example, the terminal can process the pilot reference received on each antenna and estimate the SNR for each propagation path, and may further derive the average SNR from the individual SNRs. Reporting the average SNR instead of the individual SNRs can significantly reduce the amount of information to be sent back to the base station.

In another embodiment, a number of data streams may be transmitted on a number of groups of transmission channels. Each data stream may be independently processed (i.e., coded and modulated) with a particular coding and modulation scheme, or multiple data streams may share a common coding and modulation scheme. Each group of channels may include any number and type of transmission channels. For example, one group may be defined for each antenna at the base station, with each group including all frequency subchannels for the associated antenna. As another example, one group may be defined for each frequency subchannel, with each group including all spatial subchannels for the associated frequency subchannel. As yet another example, one group may be defined for each different subset of frequency subchannels, with each group including all spatial subchannels for the associated frequency subchannels. Alternatively, each group may include one transmission channel.

The forward link quality may be reported to the base station via various forms. In an embodiment, the SNRs for the individual transmission channels or an average SNR for each group of channels may be determined and reported. In another embodiment, the terminal can map the estimated SNR to a particular rate (e.g., a data rate indicator (DRI)) and send the rate information back to the base station. The rate indicator may be indicative of the maximum data rate that may be transmitted on the corresponding group of transmission channels for the required level of performance. In yet another embodiment, the terminal may report an indication of a particular coding and modulation scheme to be used by the base station for each data stream to be independently processed. In yet another embodiment, the noise or interference power for all or a single frequency subchannel, the average channel noise variance, or some other measurement, may be reported. Various other forms may also be used to report the forward link quality and are within the scope of the invention. In general, the terminal may report any type of information that can be used at the base station to properly code and modulate data prior to transmission on the forward link.

The terminal can thus estimate the forward link quality for each group of transmission channels and report information indicative of the estimated quality (e.g., the average SNR, a rate indicator, or an indication of a coding and modulation scheme) to the base station. By reporting information for each group, the base station is able to individually and independently code and modulate each data stream based on the received information for the associated group of transmission channels, which may provide improved performance. For example, the base station may be able to transmit different data streams on different antennas, with each data stream having a particular bit rate supported by the transmission channels used to transmit the data stream.

In certain embodiments, the forward link quality can be estimated at the base station based on the pilot reference transmitted by the terminal. Because the forward and reverse links are reciprocal, the quality of the forward link can be estimated based on the quality of the reverse link, which can be estimated by the base station. Initially, the base station can estimate the SNR (e.g., average SNR) for the reverse link based on the pilot reference transmitted by the terminal (i.e., the same pilot reference used to derive the reverse channel response matrix $H_r$ at the base station). The base station is able to estimate the channel noise variance.

As shown in equation (8), the vector $\underline{z}$ recovered at the terminal is equal to the vector $\underline{b}$ scaled by the eigenvalues in the matrix $\Lambda$. The matrix $\Lambda$ can also be derived at the base station based on the forward channel response matrix $H_f$. The base station can thus estimate the signal power at the terminal (based on the matrix $\Lambda$ and the vector $\underline{b}$). The SNR at the terminal is then estimated based on the signal power and the channel noise variance computed at the base station. The estimated SNR can then be used to properly code and modulate the data.

For the embodiments wherein the forward link quality is estimated at the base station, the coding and modulation scheme(s) selected for use by the base station may be sent to the terminal so that it can use the corresponding demodulation and decoding scheme(s) to recover the transmitted data. Alternatively, the terminal may perform "blind" decoding whereby it processes the received signals based on a number of hypotheses corresponding to a number of possible coding and modulation schemes.

Various techniques may be used to estimate the link quality. Some of these techniques are described in the following patents, which are all assigned to the assignee of the present application and incorporated herein by reference:

U.S. Pat. No. 5,799,005, entitled "SYSTEM AND METHOD FOR DETERMINING RECEIVED PILOT POWER AND PATH LOSS IN A CDMA COMMUNICATION SYSTEM," issued Aug. 25, 1998, U.S. Pat. No. 5,903,554, entitled "METHOD AND APPARATUS FOR MEASURING LINK QUALITY IN A SPREAD SPECTRUM COMMUNICATION SYSTEM," issued May 11, 1999, U.S. Pat. Nos. 5,056,109, and 5,265,119, both entitled "METHOD AND APPARATUS FOR CONTROLLING TRANSMISSION POWER IN A CDMA CELLULAR MOBILE TELEPHONE SYSTEM," respectively issued Oct. 8, 1991 and Nov. 23, 1993, and U.S. Pat. No. 6,097,972, entitled "METHOD AND APPARATUS FOR PROCESSING POWER CONTROL SIGNALS IN CDMA MOBILE TELEPHONE SYSTEM," issued Aug. 1, 2000.

Methods for estimating a single transmission channel based on a pilot reference or a data transmission may also be found in a number of papers available in the art. One such channel estimation method is described by F. Ling in a paper entitled "Optimal Reception, Performance Bound, and Cut-off-Rate Analysis of References-Assisted Coherent CDMA Communications with Applications," IEEE Transaction On Communication, October 1999, and incorporated herein by reference.

Transmitter Unit at the Base Station

Figure 3A:
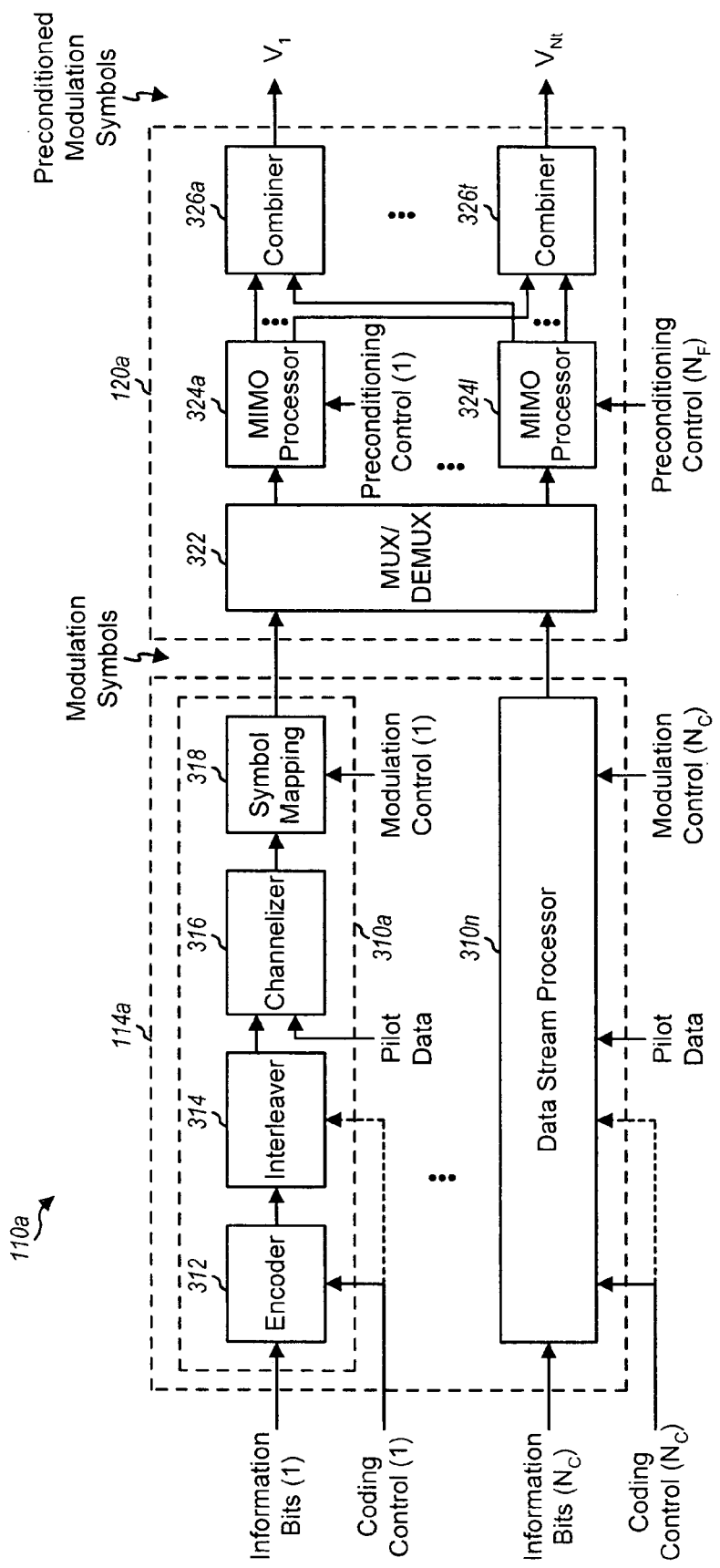
FIGS. 3A and 3B show a block diagram of a specific design of a transmitter unit within a base station, which utilizes MIMO and OFDM and is capable of processing data in accordance with an embodiment of the invention.
Figure 3B:
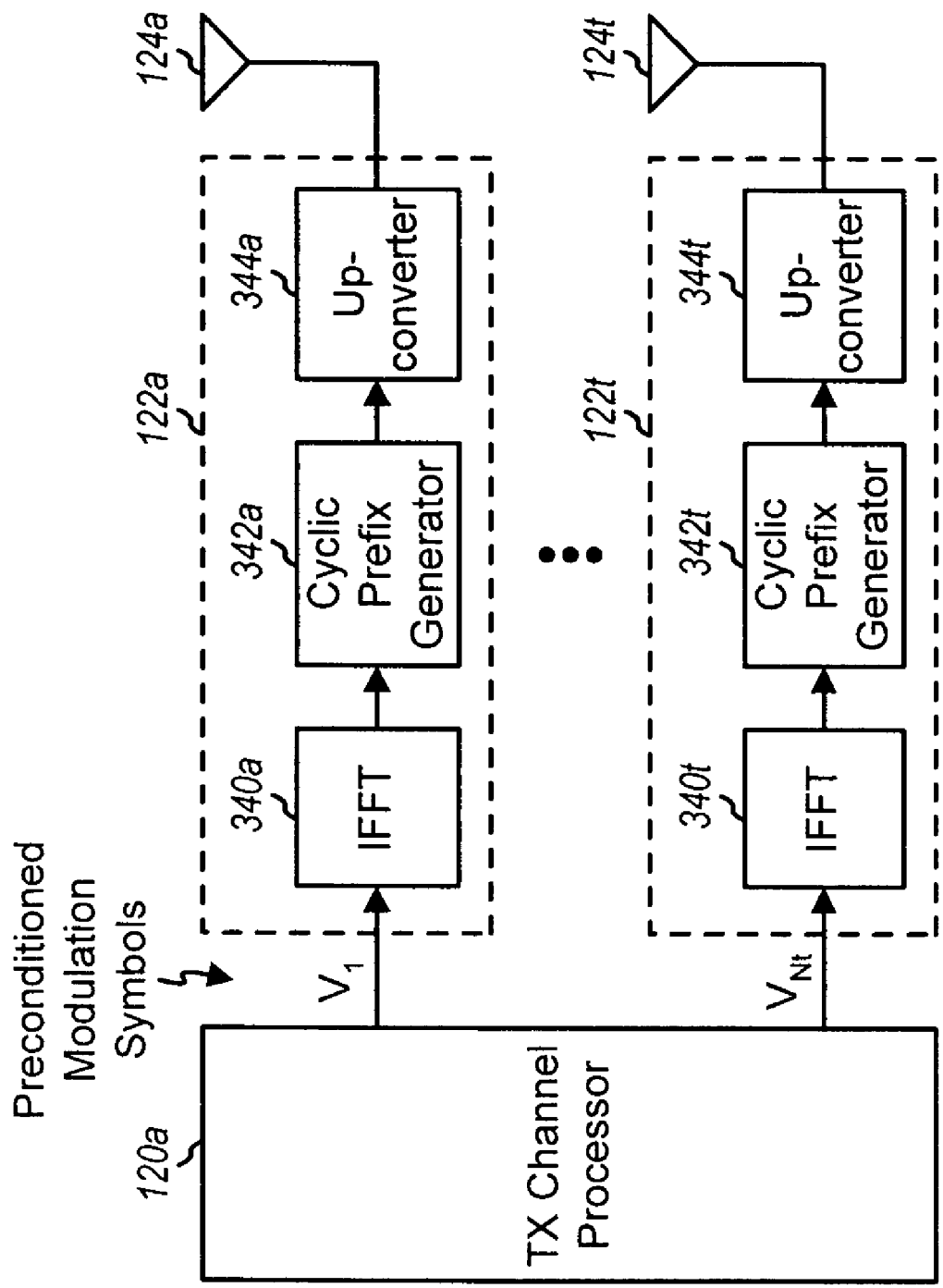

FIGS. 3A and 3B show a block diagram of a specific design of a transmitter unit 110a at a base station, which utilizes MIMO and OFDM and is capable of processing data in accordance with an embodiment of the invention. Transmitter unit 110a includes a TX data processor 114a that receives and processes information bits to provide modulation symbols, a TX channel processor 120a that preconditions the modulation symbols, and a number of modulators 122 that process the preconditioned modulation symbols to generate a number of modulated signals suitable for transmission to the terminal.

In the embodiment shown in FIG. 3A, TX data processor 114a includes a number of data stream processors 310a through 310n, one data stream processor 310 for each data stream to be independently coded and modulated. (One data stream may be transmitted on all transmission channels, on each group of transmission channels, or on each transmission channel.) Each data stream processor 310 includes an encoder 312, an interleaver 314, a channelizer 316, and a symbol mapping element 318. Encoder 312 receives the information bits for a particular data stream and encodes the received bits in accordance with a particular encoding scheme to provide coded bits. Channel interleaver 314 interleaves the coded bits based on a particular interleaving scheme to provide diversity.

Pilot data (e.g., data of a known pattern) may also be multiplexed with the processed information bits. The pilot data may be transmitted using any one of the pilot transmission schemes described above. The pilot reference may be used at the terminal to characterize the forward link and to estimate the link quality, as described above.

If code division multiplexing is utilized, channelizer 316 receives and channelizes the interleaved packet data and the pilot data on their assigned code channels. Symbol mapping element 318 then maps the channelized packet and pilot data into modulation symbols for the selected transmission channels.

As shown in FIG. 3A, the data encoding and interleaving by each data stream processor 310 may be achieved based on a respective coding control that identifies the specific coding and interleaving schemes to be used for the data stream. The symbol mapping by each data stream processor 310 may also be achieved based on a respective modulation control that identifies the specific modulation scheme to be used for the data stream. The specific coding and modulation scheme used for each data stream may be selected based on the forward link quality (e.g., as reported by the terminal)

In one type of coding and modulation scheme, the coding for each data stream is achieved by using a fixed base code and adjusting the puncturing to achieve the desired code rate, as supported by the SNRs of the transmission channels used to transmit the data stream. The base code may be a Turbo code, a convolutional code, a concatenated code, or some other code. The base code may also be of a particular rate (e.g., a rate 1/3 code). For this type of scheme, the puncturing may be performed after the interleaving to achieve the desired code rate.

Symbol mapping element 318 can be designed to group sets of channelized bits to form non-binary symbols, and to map each non-binary symbol into a point in a signal constellation corresponding to the modulation scheme selected for use. The modulation scheme may be QPSK, M-PSK, M-QAM, or some other scheme. Each mapped signal point corresponds to a modulation symbol. One modulation scheme may be selected for each transmission channel used to transmit the data stream, or a common modulation scheme may be used for all transmission channels used to transmit the data stream.

The encoding, interleaving, and symbol mapping at transmitter unit 110a can be performed based on numerous schemes. Some coding and modulation schemes are described in the following patent applications, which are all assigned to the assignee of the present application and incorporated herein by reference:

U.S. patent application Ser. No. 09/532,492, entitled "HIGH EFFICIENCY, HIGH PERFORMANCE COMMUNICATIONS SYSTEM EMPLOYING MULTI-CARRIER MODULATION," filed Mar. 22, 2000;

U.S. patent application Ser. No. 09/776,075, entitled "CODING SCHEME FOR A WIRELESS COMMUNICATION SYSTEM," filed Feb. 1, 2001;

U.S. patent application Ser. No. 09/826,481, "METHOD AND APPARATUS FOR UTILIZING CHANNEL STATE INFORMATION IN A WIRELESS COMMUNICATION SYSTEM," filed Mar. 23, 2001; and U.S. patent application Ser. No. 09/854,235, entitled "METHOD AND APPARATUS FOR PROCESSING DATA IN A MULTIPLE-INPUT MULTIPLE-OUTPUT (MIMO) COMMUNICATION SYSTEM UTILIZING CHANNEL STATE INFORMATION," filed May 11, 2001.

The modulation symbols from TX data processor 114a are provided to TX channel processor 120a, which is one embodiment of TX channel processor 120 in FIG. 1. Within TX channel processor 120a, a multiplexer/demultiplexer 322 receives and demultiplexes the modulation symbol from data stream processors 310a through 310n to the proper MIMO processors 324a through 324l. One MIMO processor 324 is provided to perform the preconditioning for each frequency subchannel.

Each MIMO processor 324 receives a stream of modulation symbols for the spatial subchannels of a particular frequency subchannel assigned to the MIMO processor. Each MIMO processor 324 further receives an eigenvector matrix E(k) for the frequency subchannel, which is a matrix of weights derived from the channel response matrix $H_f(k)$. Each MIMO processor 324 then preconditions the modulation symbols with the eigenvector matrix E(k), as shown in equations (5) and (6), to generate the preconditioned modulation symbols.

The preconditioned modulation symbols from MIMO processors 324a through 324l are provided to combiners 326a through 326t. One combiner 326 is provided for each antenna at the base station. Each combiner 326 receives and combines up to $N_F$ preconditioned modulation symbols for $N_F$ frequency subchannels for a particular antenna to form a modulation symbol vector V.

TX channel processor 120a thus receives and processes the modulation symbols to provide up to $N_T$ modulation symbol vectors, $V_1$ through $V_{Nt}$, one modulation symbol vector for each antenna for data transmission. Each modulation symbol vector V covers a single time slot, and each element of the modulation symbol vector V is associated with a specific frequency subchannel having a unique subcarrier on which the modulation symbol is conveyed.

FIG. 3B is a block diagram of an embodiment of modulators 122 for OFDM. The modulation symbol vectors $V_1$ through $V_{Nt}$ from TX channel processor 120a are provided to modulators 122a through 122t, respectively. In the embodiment shown in FIG. 3B, each modulator 122 includes an inverse Fast Fourier Transform (IFFT) 340, a cyclic prefix generator 342, and an upconverter 344.

IFFT 340 converts each received modulation symbol vector V into its time-domain representation (which is referred to as an OFDM symbol) using IFFT. IFFT 340 can be designed to perform the IFFT on any number of frequency subchannels (e.g., 8, 16, 32, . . . , or $N_F$). In an embodiment, for each modulation symbol vector converted to an OFDM symbol, cyclic prefix generator 342 repeats a portion of the time-domain representation of the OFDM symbol to form a "transmission symbol" for a specific antenna. The cyclic prefix insures that the transmission symbol retains its orthogonal properties in the presence of multipath delay spread, thereby improving performance against deleterious path effects. The cyclic prefix is selected to be sufficiently long relative to the expected amount of delay spread. The implementation of IFFT 340 and cyclic prefix generator 342 is known in the art and not described in detail herein.

The time-domain representations from each cyclic prefix generator 342 (i.e., the transmission symbols for each antenna) are further processed (e.g., converted into an analog signal, modulated, amplified, and filtered) by upconverter 344 to generate a modulated signal suitable for transmission over the forward link. The modulated signal generated by each modulator 122 is then transmitted from an associated antenna 124.

OFDM modulation is described in further detail in a paper entitled "Multicarrier Modulation for Data Transmission: An Idea Whose Time Has Come," by John A. C. Bingham, IEEE Communications Magazine, May 1990, which is incorporated herein by reference.

Receiver Unit at the Terminal

Figure 4:
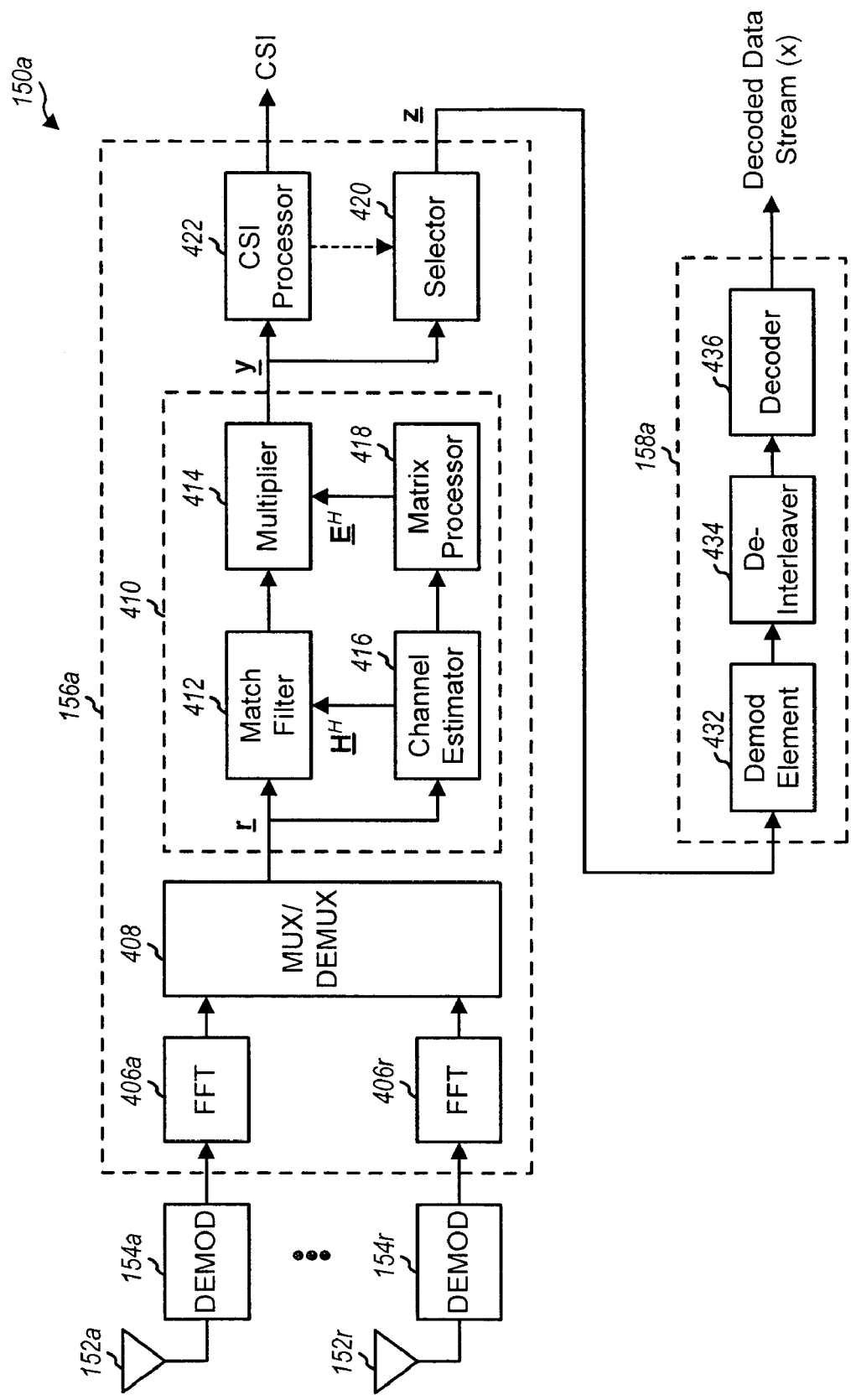
FIG. 4 is a block diagram of a specific design of a receiver unit within a terminal, which is capable of receiving data in accordance with an embodiment of the invention.

FIG. 4 is a block diagram of a specific design of a receiver unit 150a of a terminal, which is capable of receiving data in accordance with an embodiment of the invention. The transmitted signals from $N_T$ antennas at the base station are received by each of $N_R$ antennas 152a through 152r at the terminal and routed to a respective demodulator 154. Each demodulator 154 conditions, processes, and digitizes the respective received signal to provide samples, which are provided to a RX channel processor 156a.

Within RX channel processor 156a, the samples for each receive antenna 152 are provided to a respective FFT processor 406, which generates transformed representations of the received samples and provides a respective stream of modulation symbol vectors. The $N_R$ streams of modulation symbol vectors from FFT processors 406a through 406r are then provided to multiplexer/demultiplexer 408, which first demultiplexes the stream of modulation symbol vectors from each FFT processor 406 into $N_F$ streams of modulation symbols, one stream for each of the $N_F$ frequency subchannels. Multiplexer/demultiplexer 408 then multiplexes the $N_R$ streams of modulation symbols for each frequency subchannel into a stream of modulation symbol vector, $\underline{r}$, with each vector in the stream including $N_R$ modulation symbols for the $N_R$ antennas. Multiplexer/demultiplexer 408 provides the $N_F$ streams of modulation symbol vectors, one stream at a time, to a spatial processor 410.

For each frequency subchannel, a match filter 412 within spatial processor 410 filters the modulation symbol vector stream $\underline{r}$ by performing a pre-multiplication with the conjugate-transpose channel response matrix $H_f^H$, as shown above in equation (8). The channel coefficient matrix $H_f$ for the forward link may be estimated by a channel estimator 416 based on the pilot reference transmitted from the base station. An eigenvector matrix E is then derived by a matrix processor 418 based on the channel coefficient matrix $H_f$, as shown in equation (4). The filtered vectors from match filter 412 are further pre-multiplied by a multiplier 414 with the conjugate-transpose eigenvector matrix $E^H$ to generate the vectors of recovered modulation symbols $\underline{y}$, as shown in equation (8).

A selector 420 receives the vectors of recovered modulation symbols, $\underline{y}$, and extracts the modulation symbols corresponding to a particular data stream to be recovered. Selector 420 may then provide a number of symbol streams, $\underline{z}$, corresponding to a number of data streams to be recovered by the terminal. Each symbol stream $\underline{z}$ includes recovered modulation symbols that correspond to, and are estimates of, the modulation symbols $\underline{b}$ after the symbol mapping (but prior to the preconditioning) at the base station for a particular data stream. Each recovered symbol stream $\underline{z}$ is then provided to a RX data processor 158a.

Within RX data processor 158a, the stream of recovered modulation symbols for a particular data stream is demodulated by a demodulation element 432 in accordance with a demodulation scheme (e.g., M-PSK, M-QAM) that is complementary to the modulation scheme used for the data stream. Demodulation element 432 further performs decovering of the demodulated data, if the data is channelized at the base station by covering with orthogonal codes. The demodulated data is then de-interleaved by a de-interleaver 434 in a complementary manner to that performed by interleaver 314, and the de-interleaved data is further decoded by a decoder 436 in a complementary manner to that performed by encoder 312. For example, a Turbo decoder or a Viterbi decoder may be used for decoder 436 if Turbo or convolutional coding, respectively, is performed at the base station. The decoded data stream from decoder 436 represents an estimate of the transmitted data stream being recovered.

A CSI processor 422 receives the pilot and/or data transmission and estimates the forward link quality, as described above. For example, CSI processor 422 may compute a noise covariance matrix based on the received data and/or pilot and may further compute the SNR of a transmission channel. The SNR may be estimated similar to conventional pilot assisted single and multi-carrier systems, as is known in the art. The frequency response for all propagation paths (i.e., $H_f$) derived by channel estimator 416 and the forward link quality (e.g., the SNR) estimated by CSI processor 422 may comprise the CSI that is reported by the terminal to the base station. The CSI is then provided to a TX data processor 162 (see FIG. 1) for transmission back to the base station.

Referring back to FIG. 1, the CSI (e.g., $H_f$ and/or SNR) determined by RX channel processor 156 is provided to TX data processor 162, which processes the CSI based on a particular processing scheme. TX data processor 162 further receives and process pilot data for transmission from one or more antennas and on one or more frequency subchannels. The processed CSI and pilot are then received and further processed by a TX channel processor 164 and then provided to one or more modulators 154. Modulators 154 further condition and transmit the CSI and pilot on the reverse link to the base station.

At the base station, the CSI and pilot transmitted on the reverse link are received by antennas 124, demodulated by demodulators 122, and provided to a RX channel processor 132. RX channel processor 132 processes the received pilot to derive the channel response matrix $H_r$ for the reverse link. RX channel processor 132 and a RX data processor 134 also process the received data in a complementary manner to that performed by TX channel processor 164 and TX data processor 162 to recover the A controller 136 uses the recovered CSI to perform a number of functions including (1) determining the coding and modulation scheme to be used for each data stream, (2) deriving the eigenvector matrix E to be used to precondition the modulation symbols, and (3) computing the calibration function a(ω). Controller 136 then provides the coding and modulation control to TX data processor 114 and the preconditioning control to TX channel processor 120, as shown in FIG. 3A.

In the above description, the modulation symbols are preconditioned at the transmitter system based on the eigenvector matrix E derived from the channel response matrix $H_f$ for the forward link. In certain embodiments or for certain transmissions in which the channel response matrix $H_f$ is not available, the modulation symbols may be transmitted without preconditioning. In this case, linear spatial processing may be performed on the received symbols (for a non-dispersive MIMO channel with flat fading) or space-time processing may be performed (for a dispersive MIMO channel with frequency selective fading) at the terminal to null out the undesired signals and to maximize the received SNR of each of the constituent signals in the presence of noise and interference from other signals. The ability to effectively null undesired signals or optimize SNR depends upon the correlation in the channel response matrix $H_f$.

The spatial processing may be achieved using linear spatial processing techniques such as a channel correlation matrix inversion (CCMI) technique, a minimum mean square error (MMSE) technique, and others. The space-time processing may be achieved using linear space-time processing techniques such as a MMSE linear equalizer (MMSE-LE), a decision feedback equalizer (DFE), a maximum-likelihood sequence estimator (MLSE), and others. The CCMI, MMSE, MMSE-LE, and DFE techniques are described in further detail in the aforementioned U.S. patent application Ser. Nos. 09/826,481 and 09/854,235.

For clarity, various aspects have been described for data transmission on the forward link from the base station to the terminal. The techniques described herein may also be applied for data transmission on the reverse link from the terminal to the base station.

The elements of the base station (e.g., as shown in FIGS. 1, 3A, and 3B) and the elements of the terminal (e.g., as shown in FIGS. 1 and 4) may each be implemented with one or more digital signal processors (DSPs), application specific integrated circuits (ASICs), processors, microprocessors, controllers, microcontrollers, field programmable gate arrays (FPGAs), programmable logic devices, other electronic units, or any combination thereof. Some of the functions and processing described herein may also be implemented with software executed on a processor. Certain aspects of the invention may also be implemented with a combination of software and hardware. For example, the computations to determine the channel response matrix $H_f$ and the eigenvector matrix E and the preconditioning at the base station may be performed based on program codes executed on a processor (e.g., controller 136 in FIG. 1). Similarly, the computations to determine the channel response matrix $H_f$ and the eigenvector matrix E and the receiver processing at the terminal may be performed based on program codes executed on a processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of wireless communication comprising:
   transmitting at least one pilot reference from a plurality of antennas of a base station;
   receiving, at the base station, calibration information for a forward link from a terminal responsive to the at least one pilot reference;
   determining, at the base station, calibration information for a reverse link based upon signals transmitted from the terminal; and
   generating a calibration function for transmission to the terminal based upon the calibration information for the forward link and calibration information for the reverse link.

2. The method of claim 1, wherein the calibration information for the forward link comprises a forward transfer function.

3. The method of claim 1, wherein receiving the calibration information for the forward link comprises receiving the calibration information for the forward link at a start of a communication session between the base station and the terminal.

4. The method of claim 1, wherein wireless communication utilizes orthogonal frequency division modulation (OFDM) and the method further comprising transmitting, to the terminal, from the base station using the calibration function via a plurality of frequency subchannels.

5. The method of claim 1, further comprising receiving, at the base station, at least one pilot reference from the terminal.

6. The method of claim 5, wherein determining, at the base station, the calibration information for the reverse link comprises determining the calibration information for the reverse link based upon the at least one pilot reference from the terminal.

7. The method of claim 5, wherein the wireless communication utilizes orthogonal frequency division modulation (OFDM) and wherein receiving, at the base station, at least one pilot reference comprises receiving, at the base station, the pilot reference on a subset of frequency subchannels of the OFDM subchannels.

8. A base station comprising:
   a processor configured to transmit at least one pilot reference from a plurality of antennas of the base station; and
   a controller configured to generate calibration information for a reverse link based upon signals received from a terminal and generate a calibration function, for transmission to the terminal, based upon calibration information for a forward link received from the terminal and the calibration information for the reverse link.

9. The base station of claim 8, wherein the calibration information for the forward link comprises a forward transfer function.

10. The base station of claim 8, wherein the controller is configured to generate the calibration function at a start of a communication session between the base station and the terminal.

11. The base station of claim 8, wherein the controller is configured to determine the calibration information for the reverse link based upon the at least one pilot reference from the terminal.

12. The base station of claim 11, wherein communication between the base station and terminal utilizes orthogonal frequency division modulation (OFDM) and the controller is configured to determine the calibration information for the reverse link based upon the at least one pilot reference on a subset of frequency subchannels of the OFDM subchannels.

13. A base station for wireless communication comprising:
   means for transmitting at least one pilot reference from a plurality of antennas;
   means for receiving calibration information for a forward link from a terminal responsive to the at least one pilot reference;

means for determining calibration information for a reverse link based upon signals transmitted from the terminal; and means for generating a calibration function, for transmission to the terminal, based upon the calibration information for the forward link and the calibration information for the reverse link.

14. A method of wireless communication comprising:
receiving, at a terminal, at least one pilot reference from a plurality of antennas of a base station;
determining, at a terminal, calibration information for a forward link responsive to the at least one pilot reference; and
transmitting the calibration information for the forward link to the base station;
transmitting at least one pilot reference from the terminal to the base station; and
receiving, at the terminal, new calibration information produced by the base station using the calibration information for the forward link and additional calibration information for the reverse link generated responsive to the at least one pilot reference transmitted from the terminal to the base station.

15. The method of claim 14 wherein determining the calibration information for the forward link comprises determining a forward transfer function.

16. The method of claim 14, wherein determining the calibration information for the forward link comprises determining the calibration information for the forward link at a start of a communication session between the base station and the terminal.

17. The method of claim 14, wherein the wireless communication utilizes orthogonal frequency division modulation (OFDM) and transmitting the at least one pilot reference comprises transmitting the at least one pilot reference on a subset of frequency subchannels of the OFDM subchannels.

18. A terminal comprising:
a processor configured to determine calibration information for a forward link responsive to at least one pilot reference from a plurality of antennas of a base station, to transmit the calibration information and at least one pilot reference to the base station and to apply new calibration information produced by the base station using the calibration information for the forward link and additional calibration information for the reverse link generated responsive to the at least one pilot reference transmitted from the terminal to the base station; and
at least one antenna coupled with the processor.

19. The terminal of claim 18, wherein the calibration information for the forward link comprises a forward transfer function.

20. The terminal of claim 18, wherein the processor is configured to determine the calibration information at a start of a communication session between the base station and the terminal.

21. The terminal of claim 18, wherein communication between the base station and terminal utilizes orthogonal frequency division modulation (OFDM) and the processor is configured to transmit the at least one pilot reference on a subset of frequency subchannels of the OFDM subchannels.

22. A terminal for wireless communication comprising:
means for receiving at least one pilot reference from a plurality of antennas of a base station;
means for determining calibration information for a forward link responsive to the at least one pilot reference; and
means for transmitting the calibration information for the forward link to the base station;
means for transmitting at least one pilot reference from the terminal to the base station; and
means for receiving, at the terminal, new calibration information produced by the base station using the calibration information for the forward link and additional calibration information for the reverse link generated responsive to the at least one pilot reference transmitted from the terminal to the base station.

23. The base station of claim 13, wherein the calibration information for the forward link comprises a forward transfer function.

24. The base station of claim 13, wherein the means for receiving the calibration information for the forward link comprises means for receiving the calibration information for the forward link at a start of a communication session between the base station and the terminal.

25. The base station of claim 13, wherein the means for determining the calibration information for the reverse link comprises means for determining the calibration information for the reverse link based upon at least one pilot reference received from the terminal.

26. The base station of claim 25, wherein the wireless communication utilizes orthogonal frequency division modulation (OFDM) and wherein the means for receiving the at least one pilot reference comprises means for receiving the at least one pilot reference on a subset of frequency subchannels of OFDM subchannels.

27. The terminal of claim 22, wherein the means for determining the calibration information for the forward link comprises means for determining a forward transfer function.

28. The terminal of claim 22, wherein the means for determining the calibration information for the forward link comprises means for determining the calibration information for the forward link at a start of a communication session between the base station and the terminal.

29. The terminal of claim 22, wherein the wireless communication utilizes orthogonal frequency division modulation (OFDM) and the means for transmitting the at least one pilot reference comprises means for transmitting the at least one pilot reference on a subset of frequency subchannels of the OFDM subchannels.

* * * * *